March 21, 1939.　　　L. P. SHARPLES　　　2,150,943
METHOD OF MAKING CREAMERY PRODUCTS
Filed Nov. 1, 1935
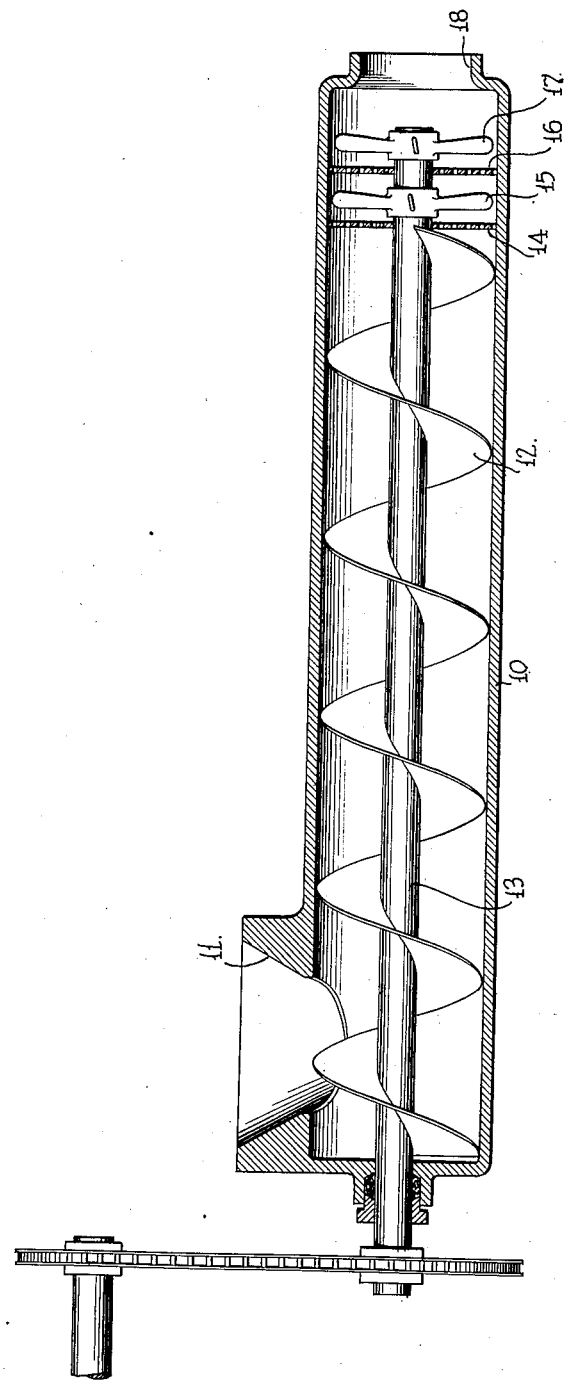
INVENTOR.
LAURENCE P. SHARPLES
BY Maurice A. Crews
ATTORNEY.

Patented Mar. 21, 1939

2,150,943

UNITED STATES PATENT OFFICE 2,150,943

METHOD OF MAKING CREAMERY PRODUCTS

Laurence P. Sharples, Ardmore, Pa., assignor to Milk Processes, Inc., Philadelphia, Pa., a corporation of Pennsylvania Application November 1, 1935, Serial No. 47,745

7 Claims. (Cl. 99—119)

The present invention pertains to the production of butterfat-containing products containing a very high proportion of butterfat. Examples of such products are butter and plastic creams containing butterfat in excess of 65%. Such products and methods by which they may be manufactured are described and claimed in the patents to Herman D. Wendt Nos. 1,791,069, 1,977,927, 1,977,928, 1,977,929 and Reissue No. 19,123.

In accordance with the technique taught in these Wendt patents, a creamery product containing butterfat in the dispersed phase, such as ordinary milk or cream, is first centrifuged to produce a true cream of unusually high butterfat content, e. g., in excess of 65%, and the product so produced is later subjected to a chilling operation to produce a plastic product which is nevertheless a true cream.

In accordance with Patents Nos. 1,791,069 and 1,977,927 the plastic cream produced in this manner is thereafter converted into butter by a pressing and/or working operation in which part of its liquid content is expelled, and its phase reversed, thus rendering the butterfat the continuous phase and the retained liquid the dispersed phase, as in ordinary butter.

While these Wendt patents produce a highly desirable plastic cream and a butter of excellent quality, the butterfat content of the products of the processes is impossible to control by prior art procedure. A consideration of the manner in which these products are produced will make the reason for this difficulty clear. It is impossible to control the butterfat content of the cream issuing from the centrifuge to a very fine degree. Variation in the quality and quantity of the feed during the run and variation of the quality of the feed from day to day all help to make such accuracy of control directly from the centrifuge out of the question. Furthermore, when the product of such a centrifuging operation has been cooled and is subjected to a working or pressing operation in which natural liquid is expelled therefrom, still further variations in the butterfat content of the product produced must necessarily occur by reason of the difficulty of controlling the amount of liquid expelled. Such variations are objectionable to the customer because he desires uniformity. They are objectionable to the producer because, in the first place the consumer is entitled to demand, and in the case of butter the U. S. law requires, a product containing not less than a stated proportion of butterfat, and in the second place economy in the manufacturing operation dictates that the ultimate product should not contain a substantially higher proportion of butterfat than the consumer expects.

The present invention is designed to solve these problems. It is not, however, directed exclusively to the production of butter, but includes within its broad scope the production of other products of standardized butterfat content in excess of 65% which may be used as spreads or for other purposes for which butter and plastic creams have been heretofore used.

An object of the present invention is therefore to produce a plastic product which may, within the broad scope of the invention, be either plastic cream or butter and which possesses a rigorously controlled proportion of butterfat. A second object has been to produce a product of this character having a fine texture and quality which render it capable of being spread smoothly.

A third object has been to produce a product of this character to which flavoring materials have been added and which contains the flavoring materials in exactly desired proportion to the butterfat and liquid present.

Other objects and the manner in which they have been attained will be evident from a reading of the sub-joined specification, in which The single figure illustrates diagrammatically a simple form of working apparatus by which the texture of a product produced in the practice of the invention may be improved.

The first steps in the practice of the new process are identical with the steps described in the above-identified Wendt patents. An ordinary milk or cream is first heated to a temperature sufficiently high to liquefy its butterfat and is then passed through a centrifugal separator to concentrate its fat phase within the natural liquid and produce a cream having a fat content in excess of 65%. The cream effluent is discharged as a viscous liquid from the cream spout of the centrifugal separator and is maintained warm in order to keep it liquid during the next ensuing steps of the process. A small sample of a weighed batch of the cream effluent from the centrifuge is tested in order to ascertain its exact butterfat content. A small proportion of liquid is added to the collected cream in measured amount sufficient to reduce the butterfat content of the product to a definite standard.

In case it is desired to produce a salted butter, the weighed batch of liquid cream, which may be of about 83% fat content, will be accurately tested for fat content, and exactly the right amount of skimmed milk and salt can be added to give the final product a composition of 80.1% fat and 2% salt, thus being safely but not waste-fully over the legal requirement of 80% fat. This positive control represents a striking contrast to the absence of such control in conventional butter-making procedure, in which the finished butter may vary in butterfat content between 79 and 84%, thereby involving enormous losses of fat, and in some cases causing rejections and fines by Federal officers.

In case it is desired to produce a plastic spreadable product other than butter, which may be a cream of butterfat content similar to butter if desired, the butterfat content of the product may be similarly reduced, for example, to 80% by addition of liquid. At this stage of the operation, flavoring and coloring materials may be added while the cream is still in a liquid condition. Addition of these materials at this stage of the operation is substantially preferable to addition thereof at a later stage in the operation, for these materials may be more readily dispersed in the cream while the entire body thereof is freely fluid than at a subsequent stage when the cream has been converted to a plastic condition. Salt, starter and butter coloring material may, for example, be added at this stage of the operation in a case in which butter or a product having a flavor and texture resembling butter is to be the ultimate product of the process.

After the production and standardization of the liquid cream, and the addition of flavoring materials if desired, the next step in the preferred embodiment of the invention consists in the cooling of the liquid super-cream to a condition of plasticity. In this step the cream is preferably cooled to a temperature of less than 55° F. This cooling operation may be performed in various types of apparatus, but the preferred form of cooler for use in this connection is the apparatus disclosed in the patent to Wendt, No. 2,087,587, issued July 20, 1937, for Manufacture of plastic cream, and embodying a continuously rotating drum which carries the super-cream in a thin sheet during the chilling operation and from which the chilled plastic cream is discharged by a scraper or other equivalent apparatus. At the conclusion of the chilling operation, the plastic cream may be stored or shipped in this plastic condition. A further step may be performed immediately upon completion of the chilling operation, or after storage and shipment.

This further step in the preferred practice of the process consists in the subjection of the chilled plastic cream to a working operation to change its texture. The extent to which this last-mentioned operation is carried is dictated by the nature of the product desired. If the plastic cream is to be used for ice cream, cream cheese or fluid cream manufacture, working may be omitted. In cases in which it is desired to produce a plastic cream for use as a spread, this working operation may be of a very mild character merely designed to improve the texture of the cream without entirely reversing its phase. In other cases in which it may be desired to produce a true butter, the working operation will be of a more extensive character. The attached drawing illustrates one form of apparatus in which this operation may be performed. This apparatus consists in an imperforate housing 10 adapted to receive the plastic product through an opening 11 in its upper end and containing a screw conveyor 12 mounted on a shaft 13 which is designed to propel the plastic product laterally through that housing. A perforated plate 14 may be mounted within the housing to afford a desired degree of back pressure and turbulence in the cream being conveyed through the housing and thus insure that the desired degree of pressure and working is imposed upon the cream being propelled through the housing. An agitator blade 15 may be mounted on the shaft 13 beyond the perforated plate 14 in order that the product extruded through the plate 14 may be further worked at this point. A second perforated plate 16 may be mounted beyond this blade 15 and a second agitator blade 17 mounted upon the shaft 13 beyond plate 16. The butter or cream may be extruded from the housing through a die or reduced opening 18 and subjected to further operations such as cutting and printing conventionally used in butter-manufacturing processes. The shaft 13, screw 12, and die 18 may be made hollow so that their temperature can be controlled by the introduction and circulation of water.

It will be evident from the above discussion that the initial steps of the process of the present invention differ from those of the processes of the Wendt patents in that a product of standardized butterfat content is produced. It will also be evident that the technique by which the ultimate product is produced from a plastic cream is fundamentally distinguished from the technique of the Wendt patents in that the liquid content of the plastic cream is carefully controlled and, in the preferred form of the invention, the working and/or pressing operation is performed in such a manner as to avoid opportunity for the escape of liquid and thus enables the operator to obtain an ultimate product whose liquid content is the same as that of the plastic cream which has been subjected to the working operation.

While the preferred embodiment of the invention involves production of a product containing butterfat in the proportion in which butterfat ordinarily exists in butter, i. e., 80% or higher, it will be evident that the principles of the invention may be applied to the production of products containing a much smaller proportion of butterfat, i. e., between 65% and 80%. I do not, therefore, wish to be limited by the specific details of the above disclosure, but claim as my invention all of the subject matter broadly comprehended within the scope of the sub-joined claims.

I claim:

1. The method of producing a standardized plastic creamery product having a given butter fat content which comprises the steps of centrifuging a liquid creamery product containing butter fat in the dispersed phase to produce a cream containing at least 65% butter fat and in excess of the proportion of butter fat desired in the final product, diluting said concentrated cream to produce a liquid cream having the proportion of butter fat desired in the final product, and thereafter cooling said concentrated and standardized product to effect modification thereof to a plastic condition, and working said plastic product in a manner to avoid expulsion of liquid therefrom to change the texture of said product while retaining its standardized liquid content.

2. The method of producing a standardized plastic creamery product having a given butter fat content which comprises the steps of centrifuging a liquid creamery product containing butter fat in the dispersed phase to produce a cream containing at least 65% fat and in excess of the proportion of butter fat desired in the final product, diluting said concentrated cream with a liquid to produce a liquid cream having the proportion of butter fat desired in the final product, and thereafter cooling said concentrated and standardized product to effect modification thereof to a plastic condition, and changing the texture of said plastic product by subjecting the same to pressure in a manner to avoid expulsion therefrom of any of its standardized liquid content.

3. The method of producing a standardized plastic creamery product having a given butter fat content which comprises the steps of centrifuging a liquid creamery product containing butter fat in the dispersed phase to produce a cream containing over 80% butter fat and in excess of the proportion of butter fat desired in the final product, diluting said concentrated cream to produce a liquid cream having the proportion of butter fat desired in the final product, and thereafter cooling said concentrated and standardized product to effect modification thereof to a plastic condition, and working said plastic product in a manner to avoid expulsion of liquid therefrom to change the texture of said product while retaining its standardized liquid content.

4. The method of producing a standardized plastic creamery product having a butter fat content of at least 80% which comprises the steps of centrifuging a liquid creamery product containing butter fat in the dispersed phase to produce a cream containing over 80% butter fat, diluting said concentrated cream with a liquid to produce a liquid cream having a butter fat content of at least 80% desired in the final product, and thereafter cooling said concentrated and standardized product to effect modification thereof to a plastic condition, and changing the texture of said product by subjecting the same to pressure in a manner to avoid expulsion therefrom of any of its standardized content.

5. The method of producing a standardized butter from a creamery product having a high butter fat content which comprises the steps of centrifuging a liquid creamery product containing butter fat in the dispersed phase to produce a cream containing more than 80% butter fat and in excess of the proportion of butter fat desired in the final butter product, diluting said concentrated cream with liquid to produce a liquid cream having the proportion of butter fat desired in the final product, and thereafter cooling said concentrated and standardized product to effect modification thereof to a plastic condition, and pressing said plastic product to reverse the phase thereof while retaining its whole standardized liquid content.

6. The method of producing a standardized butter having a butter fat content of at least 80% which comprises the steps of centrifuging a liquid creamery product containing butter fat in the dispersed phase to produce a cream containing butter fat in excess of 80%, diluting said concentrated cream to produce a liquid cream having at least 80% butter fat, thereafter working said plastic product to produce butter while avoiding expulsion therefrom of any of its standardized liquid content.

7. The method of producing butter having a butter fat content of at least 80% which comprises the steps of centrifuging a liquid creamery product containing butter fat in the dispersed phase to produce a cream containing butter fat in excess of 80%, diluting said concentrated cream with liquid to produce a cream having at least 80% butter fat, thereafter pressing said plastic product in a manner to produce butter while avoiding expulsion therefrom of any of its standardized liquid content.

LAURENCE P. SHARPLES.